(12) United States Patent
Deissner et al.

(10) Patent No.: US 10,671,613 B2
(45) Date of Patent: Jun. 2, 2020

(54) DATA SOURCE BINDING USING AN ODATA MODEL

(71) Applicants: Klaus Deissner, Hochstadt (DE); Christoph Scheiber, Reilingen (DE)

(72) Inventors: Klaus Deissner, Hochstadt (DE); Christoph Scheiber, Reilingen (DE)

(73) Assignee: SAP SE, Walldorf (DE)

( * ) Notice: Subject to any disclaimer, the term of this patent is extended or adjusted under 35 U.S.C. 154(b) by 491 days.

(21) Appl. No.: 14/542,200

(22) Filed: Nov. 14, 2014

(65) Prior Publication Data

US 2016/0140184 A1    May 19, 2016

(51) Int. Cl.
*G06F 16/00* (2019.01)
*G06F 16/2455* (2019.01)

(52) U.S. Cl.
CPC .............. *G06F 16/24564* (2019.01)

(58) Field of Classification Search
None
See application file for complete search history.

(56) References Cited

U.S. PATENT DOCUMENTS

| | | | |
|---|---|---|---|
| 7,603,260 B2 | 10/2009 | Schmitz et al. | |
| 8,412,549 B2 | 4/2013 | Graeber et al. | |
| 8,560,392 B2 | 10/2013 | Asal et al. | |
| 8,615,451 B1 | 12/2013 | Thiele et al. | |
| 8,812,480 B1 * | 8/2014 | Watson | G06F 16/3331 707/710 |
| 2004/0015543 A1 | 1/2004 | Schmidt et al. | |
| 2012/0143893 A1 * | 6/2012 | Abraham | G06F 11/3476 707/769 |
| 2012/0197963 A1 * | 8/2012 | Bouw | G06F 16/258 709/202 |
| 2013/0179229 A1 | 7/2013 | Graeber et al. | |
| 2013/0262501 A1 * | 10/2013 | Kuchmann-Beauger | G06F 17/30958 707/769 |
| 2013/0339367 A1 * | 12/2013 | Adayikkoth | G06F 16/2219 707/741 |
| 2014/0006221 A1 | 1/2014 | Thiele et al. | |
| 2014/0006222 A1 | 1/2014 | Hericks et al. | |
| 2014/0006368 A1 * | 1/2014 | Moser | G06F 16/24 707/705 |
| 2014/0188916 A1 * | 7/2014 | Kieselbach | G06Q 10/0631 707/755 |
| 2014/0337815 A1 * | 11/2014 | Erlewein | G06F 8/30 717/106 |
| 2014/0365833 A1 * | 12/2014 | Bourne | G06F 11/3636 714/45 |
| 2015/0149445 A1 * | 5/2015 | Foebel | H04L 43/10 707/722 |

* cited by examiner

*Primary Examiner* — Diedra McQuitery
(74) *Attorney, Agent, or Firm* — Fish & Richardson P.C.

(57) ABSTRACT

The present disclosure describes methods, systems, and computer program products for providing pattern-based data source binding in OData services. One design-time computer-implemented method includes receiving an OData request from a requestor, traversing, by a computer, a rule table to determine whether an exact match for the received OData request exists in the rule table, upon a determination that an exact match for the received OData request exists in the rule table, forwarding the OData request to a bound data source specified in the rule table, and transmitting a result to the requestor following processing of the OData request by the bound data source.

20 Claims, 8 Drawing Sheets

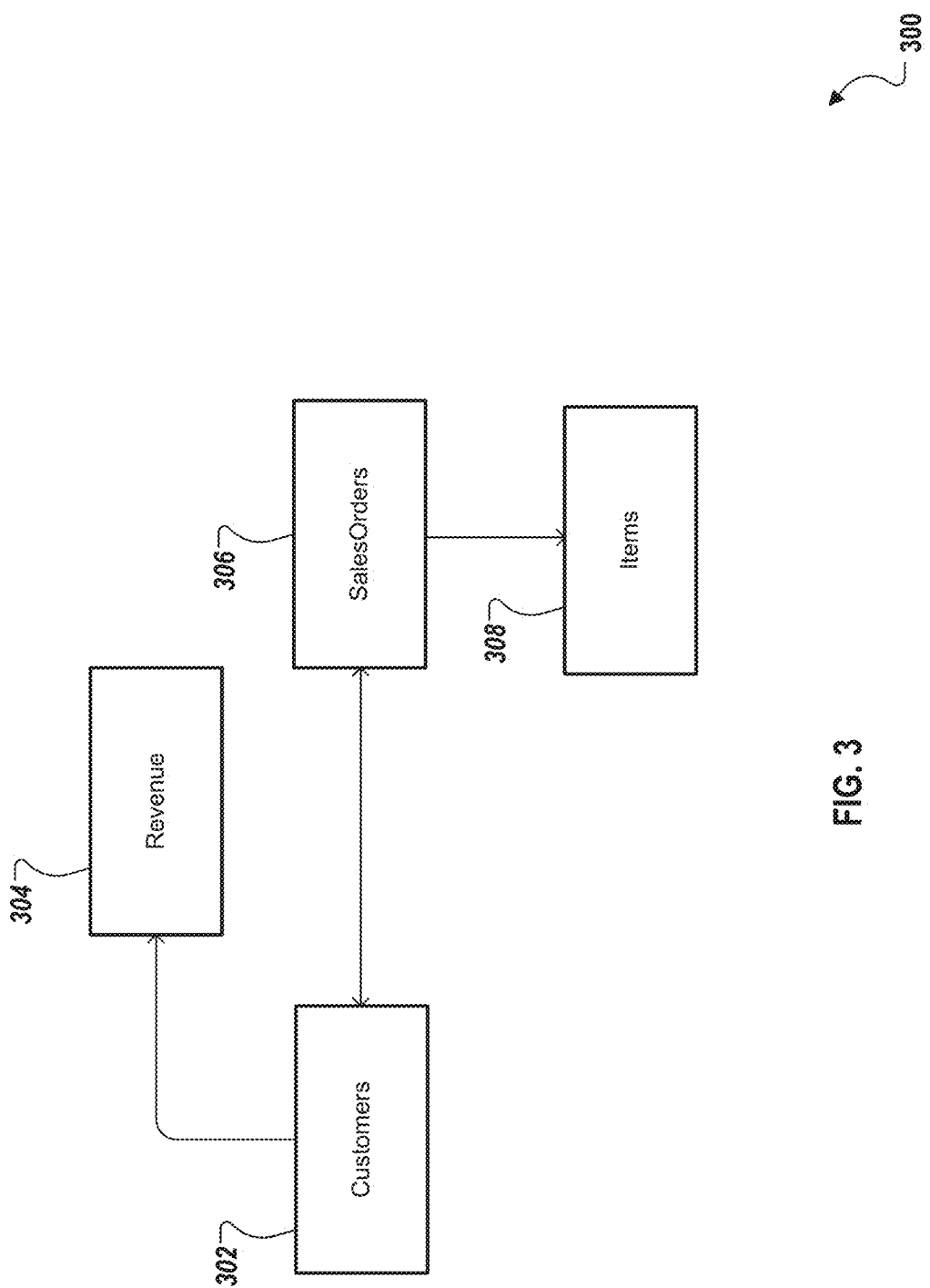

| Navigation Path | Method | $expand | $count | ... | DS Type | DS Name |
|---|---|---|---|---|---|---|
| SalesOrders | Query | | | | Function | BAPI_EPM_..._LIST |
| SalesOrders | Read | | | | BAPI | Epm.OrderRead |
| Items | Query | | | | BAPI | Epm.OrderRead |
| SalesOrders / Items | Query | | | | Coding | MY_METHOD_01 |
| SalesOrders / Items | Query | X | | | Coding | MY_METHOD_02 |
| SalesOrders / Items / Products | Query | X | | | Coding | MY_METHOD_04 |
| Categories / Products | Query | X | | | Coding | MY_METHOD_03 |
| Products | Query | | | | Coding | MY_METHOD_05 |
| Categories / Products | Query | | X | | Coding | MY_METHOD_06 |
| SalesOrders | Create | | | | Coding | MY_METHOD_07 |
| SalesOrders / Items / Schedule | Create | | | | Coding | MY_METHOD_08 |
| SalesOrders | Delete | | | | Coding | MY_METHOD_09 |

FIG. 4B

| Scope | Navigation Path | Method | DS Type | DS Name |
|---|---|---|---|---|
| Collection | SalesOrders | GET | Function | BAPI_EPM_..._READ |
| Entry | SalesOrders | GET | | |
| Entry | SalesOrders / Items | GET | BAPI | Epm.OrderRead |
| Composite | SalesOrders / Items / Products | GET | Coding | MY_METHOD_01 |
| Value | SalesOrders / Items / Status | GET | | |
| Count | SalesOrders | GET | | |
| Composite | SalesOrders / Items | POST | | |
| Collection | SalesOrders | DELETE | | |

DATA SOURCE BINDING USING AN ODATA MODEL

BACKGROUND

Open data protocol (OData) can be regarded as structured query language (SQL) for a web-based request environment. The number of possible OData requests for a specific OData service is very high and grows with increasing numbers of model entities and features that the OData standard defines, specific runtimes that OData supports, and specific features that the specific runtimes support. In using OData, there are usually a large variety of available data sources that differ in both structure and behavior and the selection of a best matching data source for a single OData request is typically based on affected model entities and request parameters. Therefore, implementing an OData service means that many combinations of affected model entities and different query options need to be handled. Although all possible combinations do not need to be supported by each OData service (or at least a fallback is available to a less efficient, but working, generic implementation is possible), it is important, for at least efficiency reasons, to maintain an overview of which requests a particular OData service implementation can support. The maintenance of a particular overview, however, typically leads to high complexity, a need to define and enforce structures associated with the particular OData service implementation, additional cost, and/or unnecessary use of business resources.

SUMMARY

The present disclosure relates to computer-implemented methods, computer-readable media, and computer systems for providing pattern-based data source binding in OData services. One design-time computer-implemented method includes receiving an OData request from a requestor, traversing, by a computer, a rule table to determine whether an exact match for the received OData request exists in the rule table, upon a determination that an exact match for the received OData request exists in the rule table, forwarding the OData request to a bound data source specified in the rule table, and transmitting a result to the requestor following processing of the OData request by the bound data source.

Other implementations can include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination:

A first aspect, combinable with the general implementation, parsing the received OData request into constituent parts to enable the matching determination.

A second aspect, combinable with any of the previous aspects, comprising determining that an exact match for the received OData request does not exist in the rule table.

A third aspect, combinable with any of the previous aspects, comprising determining whether a more general pattern in the rule table will match the received OData request.

A fourth aspect, combinable with any of the previous aspects, comprising, upon a determination that a less optimal pattern does not match the received OData request, transmitting an error message as a response to the requestor.

A fifth aspect, combinable with any of the previous aspects, comprising, upon a determination that a less optimal pattern matches the received OData request, determining whether a less optimal match between the received OData request and the rule table can be used based, at least in part, on runtime capabilities of an OData runtime.

A sixth aspect, combinable with any of the previous aspects, comprising forwarding the OData request to a bound data source specified in the rule table for the less optimal match.

The subject matter described in this specification can be implemented in particular implementations so as to realize one or more of the following advantages. First, a list of rules can be collected/implemented from a mock service tracing, best practices, knowledge about client implementation technology, and from a developer's experience. Second, rule selection/implementation criteria may also be used to simplify necessary development steps for data source binding. Third, a list of supported access patterns, a list of rules, may be used for extended validations and for more convenient navigation to traces, error logs, etc. in a development phase. Fourth, in some implementations, one binding model could be used and be maintained in design tools, simplify service implementations, and/or simplify service maintenance (corrections). Fifth, the described binding model could help provide the same user experience across multiple platforms. Sixth, the binding model can easily be represented (e.g., a non-graphical solution, a table or a tree). Seventh, tools can be supplied that make selection of platform specific data sources simple for developers (e.g., wizards, validation tools, etc.). This would simplify development of the service based on access patterns. Eighth, a list of implemented access patterns can serve as a description of the capabilities of an OData service. The list complements the description of a data model contained in the OData service's metadata document and is particularly useful when listing the OData service in an API management tool. Other advantages will be apparent to those skilled in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

FIG. 3 represents an example data model underlying the sample flow of FIG. 2 according to an implementation.

FIGS. 4B and 4C are example alternative rule tables used to select an optimal data source for an OData request according to an implementation.

Like reference numbers and designations in the various drawings indicate like elements.

DETAILED DESCRIPTION

Figure 1:
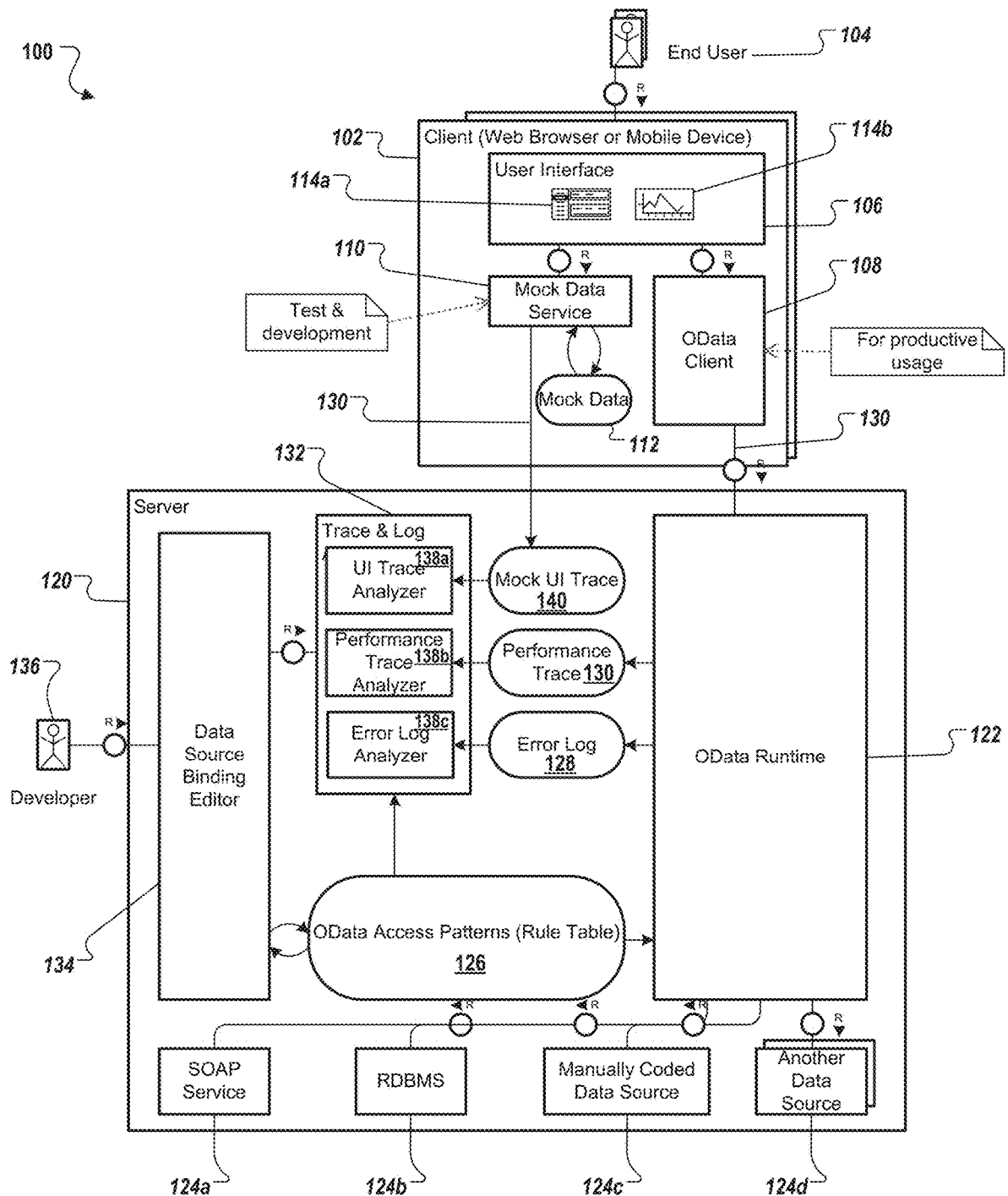
FIG. 1 is a high-level architecture block diagram illustrating an example distributed computing system (EDCS) for providing for providing pattern-based data source binding in OData services according to an implementation.

The following detailed description is presented to enable any person skilled in the art to make, use, and/or practice the disclosed subject matter, and is provided in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described and/or illustrated implementations, but is to be accorded the widest scope consistent with the principles and features disclosed herein.

Open Data Protocol (OData) is a web protocol for querying and updating data over networks and allows for a user to request data from a data source over the Hypertext Transfer Protocol (HTTP) and receive results back from the data source in formats such as Atom Publishing Protocol (Atom), JAVASCRIPT Object Notation (JSON), and Extensible Markup Language (XML), etc. The OData protocol is increasingly used by mobile computing and other computing platforms, such as smartphones and tablet computers, as an important method of access to information over networks.

OData can be regarded as structured query language (SQL) for a web-based request environment. Open Data Protocol (OData) can be used to access data services (e.g., creation, reading, updating, and/or deletion of data) for web-based applications. Typically, an OData request can be provided as a URL (Uniform Resource Locator) that includes one or more of various supported OData options, but, in other implementations, OData requests can also be structured in other appropriate forms.

The following are example URLs used as SELECT statements:

http://example.services.odata.org/ODataExample/
ODataExample/ODataExample/
ODataExample/
ODataExample/
http://example.services.odata.org/ODataExample/
ODataExample/
ODataExample/
http://example.services.odata.org/ODataExample/
ODataExample/
ODataExample/
http://example.services.odata.org/ODataExample/
ODataExample/
http://example.services.odata.org/ODataExample/
ODataExample/

An OData service implementer may desire to provide an optimized service implementation to service a particular OData request. In using OData, there are usually a large variety of available data sources that differ in both structure and behavior and the selection of a best matching data source for a single OData request is typically based on affected model entities and request parameters, specific runtimes that OData supports, and specific features that the specific runtimes support.

For example, data sources for OData requests can include remote function call (RFC), business application programming interface (BAPI), database view (conventional, in-memory, etc.), web services, custom implementations, etc. Building blocks of an OData request can include HTTP verbs (e.g., GET, POST, PUT, MERGE/PATCH, DELETE, etc.), path can include entity sets, navigation properties, key values, etc. OData request options can include, among other things, $orderby, $top, $ skip, $filter, $expand, $format, $select, $inlinecount, etc.

Therefore, implementation binding has been a challenge to date. Existing data sources are typically optimized for specific use cases and not for OData service requests. Also, most OData services only support only a subset of possible OData requests. Implementing an OData service means that many combinations of affected model entities and different query options need to be handled as efficiently as possible. Although all possible combinations do not need to be supported by each OData service (or at least a fallback is available to a less efficient, but working, generic implementation is possible as the given requests are typically not sent by known consumers), it is important, for at least efficiency reasons, to maintain an overview of which requests a particular OData service implementation supports. The maintenance of a particular overview, however, typically leads to high complexity, a need to define and enforce structures associated with the particular OData service implementation, additional cost, and/or unnecessary use of business resources. In other words, it is difficult to provide a specific, optimized solution for every one of the large number of possible OData requests. Additionally, the service implementation needs to select a most efficient data source to be used for each request.

Implementation binding has also been a challenge to date. Existing data sources are optimized for specific use cases and not for OData service requests. Most OData services only support only a subset of possible OData requests. For example, data sources can include remote function call (RFC), business application programming interface (BAPI), database view (conventional, in-memory, etc.), web services, custom implementations, etc. Building blocks of an OData request can include HTTP verbs (e.g., GET, POST, PUT, MERGE/PATCH, DELETE, etc.), path can include entity sets, navigation properties, key values, etc. Options can include $orderby, $top, $ skip, $filter, $expand, $format, $select, $inlinecount, etc.

The disclosed subject matter describes comparing each incoming request with a list of predefined OData access patterns. A table of rules (prioritized) defines one data source binding for each pattern. If the first rule matches a particular pattern, a corresponding data source will be used.

FIG. 1 is a high-level architecture block diagram illustrating an example distributed computing system (EDCS) 100 for providing for providing pattern-based data source binding in OData services according to an implementation. At a high level, the illustrated EDCS 100 includes or is made up of one or more communicably coupled computers (see FIG. X) that communicate across a network 130. In some implementations, the EDCS can wholly or partially be implemented to operate within or as a part of a cloud-computing-based environment. Although there are only two indicated instances of network 130, one or more other illustrated connections between components of the EDCS 100 can also be considered part of network 130. The illustrated EDCS 100 is typically a client/server-type environment and includes a client 102 (e.g., a web browser/ native application on a mobile computing device, etc.) and a server 120 communicating over the network 130.

The client 102 typically includes an OData-based GUI 106 and OData client 108 that interface with a back end server (e.g., server 102) OData runtime/data in a productive mode. In some implementations, the client 102 also includes a mock data service 110 and mock data 112 to allow a development or design-time mode. An end user 104 typically works with an OData-based GUI 106 that interfaces with an OData-based client 108. Although the GUI 106 is illustrated with two example GUIs (114a and 114b), the GUI 106 can display an appropriate GUI interface. The client 108 can be used to perform sending/receiving and other appropriate functions related to OData service requests (e.g., translation, normalization, parsing, etc.).

In some implementations, the user interface 106 and the OData client 108 can be separate components (as illustrated). In other implementations, the user interface 106 and the OData client 106 can be combined into a single component. OData requests to one or more backend servers can be generated from hypertext transfer protocol (HTTP) or hypertext transfer protocol secure (HTTPS) requests received from the user interface 106 (e.g., if a web browser). The ODAta client 108 can convert internal requests/responses in any format (e.g., in an OData format) back into HTTP/HTTPs to return data to the user interface 106. As will be appreciated by those skilled in the art, the use of OData (as well as HTTP(S), RFC, XML/JSON, and/or the like) can be substituted for other protocols, computer languages, etc. The exemplary use of a protocol, computer language, etc. in this disclosure is not meant to be limiting in any way. Other appropriately formatted requests in any protocol and/or computer language are also considered to be within this scope of this disclosure.

In some implementations, illustrated components of the EDCS 100 can be stand-alone and/or incorporated into any component of the EDCS 100. In some implementations the illustrated components can be one or more hardware servers, software servers, and/or virtual servers. In some implementations, the server 120 and/or associated components can be part of a web server, a streaming server, an RSS server, or other suitable server.

Server 102 typically includes the OData runtime 122 that interfaces with various data sources, for example, a SOAP service 124a, relational database management system (RDBMS) 124b, a manually coded data source 124c, and/or another data source 124d which can be any appropriate data source consistent with this disclosure. In productive mode, the OData runtime 122 receives all requests from the OData client 108. Based on OData access patterns (e.g., a rule table) 126, the OData runtime 122 will typically select a single data source (e.g., 124a-d) and call it to retrieve appropriate data which is returned to the OData client 108. In some implementation, more than one data source (e.g., 124a-d) can be called for data. The OData runtime 122 also interfaces with OData access patterns 126, an error log 128, and/or a performance trace 130, where the OData access patterns 126 are read by the OData runtime 122, and the error log 128/performance trace 130 are written by the OData runtime 122. The OData runtime 122 in typical implementations does not create or store new OData access patterns 126 as OData access patterns are, in these implementations, created at design time.

The OData access pattern 126 typically interfaces with a trace and log analyzer 132 and a data source binding editor 134 (e.g., used by a developer 136 to develop pattern-based data source bindings). During a design time, the developer 136 can use the data source binding editor 134 to maintain the OData access patterns 126 for a selected service. In some implementations, the data source binding editor 134 can use trace data from a mock data service 110 or from other sources to propose missing bindings (which may be needed) or to validate existing bindings. The trace and log analyzer 132 typically includes a UI trace analyzer 138a, a performance trace analyzer 138b, and/or an error log analyzer 138c. The trace and log analyzer 132 is used to analyze mock UI traces 140, performance traces 130, error logs, and/or other data (whether or not illustrated) to generate, for example, metrics, statistics, performance measurements, error rates, etc.

In the productive mode (e.g., used by the end user), the GUI 106 and OData client 108 sends OData requests to the server 120 which are handled by the OData runtime 122 to retrieve data to be displayed to the end user. The OData runtime 122 analyzes the request and matches it against existing OData Access Patterns 126 for the service. If a match is found, a corresponding data source (e.g., 124a-d) is called. In case of errors, an entry is written to an Error Log 128. If the request is executed normally, an entry is written to the Performance Trace 130.

In the development or design time mode where no backend OData runtime (service) is available, the mock service 110 may serve as a basis for a preview mode using the mock (sample) data 112. The mock data service 110 can also interface with the back end server to generate mock UI trace 140 data for analysis by a trace and logging analyzer. Here, the user interface 106 can be tested without an OData service implementation by using the mock data service 110. The mock data service 110 can record the requests it gets and write them to the mock UI trace 140. All traces can be analyzed by a developer from within the data source binding editor 134 to create or improve a service implementation. If a specific OData access pattern is important for the user interface 106 flow, it should be bound to a highly optimized Data Source (e.g., 124a-d or other data source).

Figure 2:
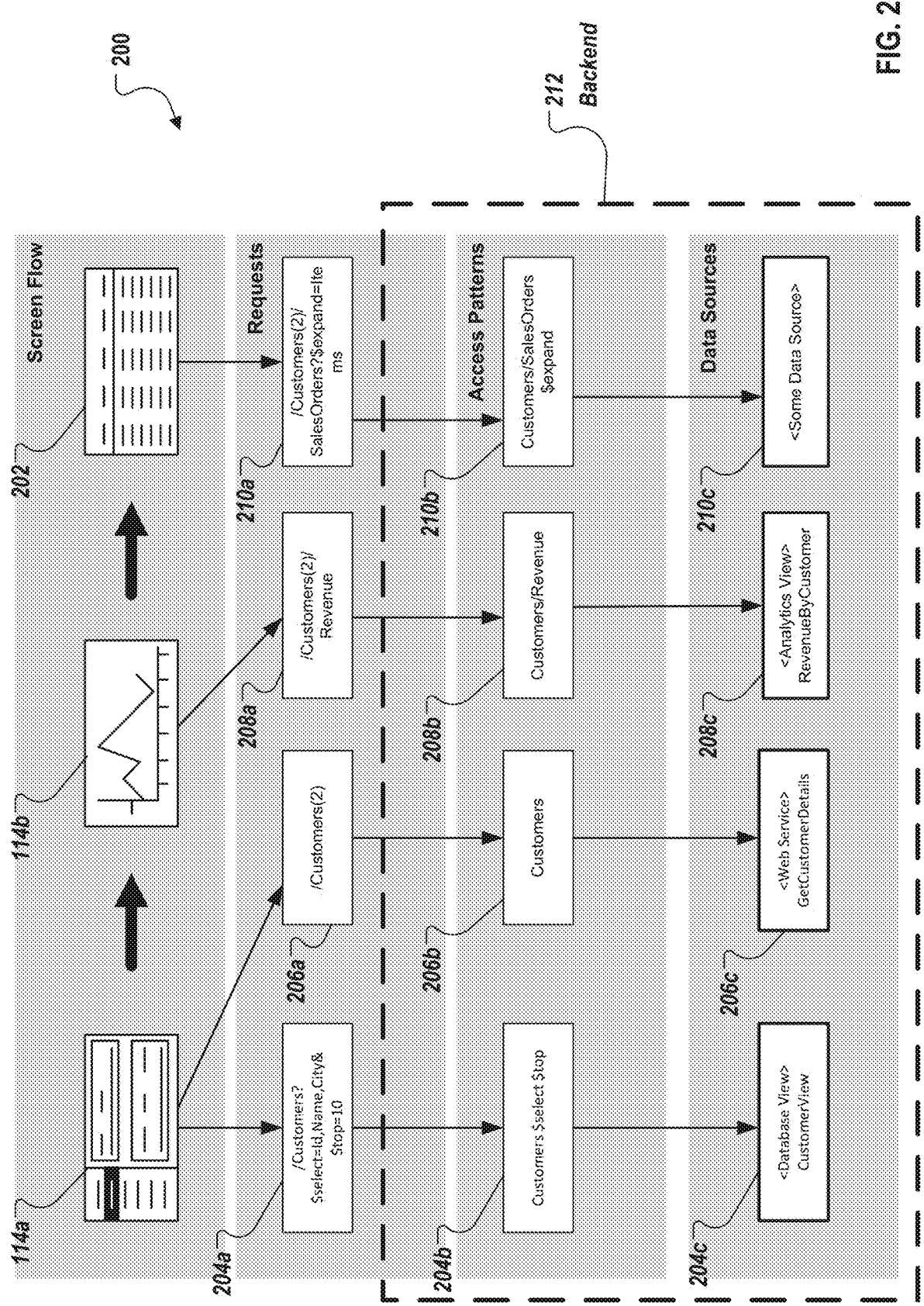
FIG. 2 illustrates an example flow of a possible set of graphical user (GUI) interfaces as seen by a user as well as the underlying OData requests that are made with each selection on the GUI according to an implementation.

FIG. 2 illustrates an example flow of a possible set of graphical user (GUI) interfaces 200 as seen by a user as well as the underlying OData requests that are made with each selection on the GUI according to an implementation. The sample flow illustrated in FIG. 2 describes one possible GUI and is based on a simple data model (that provides Customers, Revenue Numbers, Sales Orders and Sales Order Items—see FIG. 3) for understanding and should not be considered limiting in any way. For example, the described sample flow assumes that a specific GUI is used by one application user. Following the user's interaction the GUI processes several screens in a sequence. Sometimes only the screen content is updated and sometimes the GUI triggers the navigation to the next screen. An end user would see the GUI screen flow from left to right from 114a to 114b to 202.

Depending on the individual definition of each screen the frontend will send different requests to a backend 212. Some questions that may be considered include: What aggregated values shall be displayed in the header? Which columns in a table are currently visible? What line is selected triggering the display of details? Answers to these questions influence the definition of requests sent from the GUI client (e.g., 106/108) to the service backend (e.g., backend 212). The more precise the requests are defined to be, the more options the backend 212 has to optimize for processing. In this example, the requests are URLs used to retrieve resources. Besides the explicit service address, the requests can also contain, for example, filter criteria ($filter), field selections ($select), paging information ($top, $skip), object keys, navigation paths, and/or the like.

Once a request reaches the backend 212, the specific request is compared against pre-defined access patterns. In some implementations, the first matching pattern decides on the activated rule and by this the data source to be used to answer the request. If multiple data sources match, the one with the highest priority is taken. In typical implementations, this is the most important step at service runtime: to select the best matching data source fast and correctly. Example data sources can include, among others, a web service operation, a database, an analytics view, simply any coded logic provided by the service developer, and/or the like.

Turning now to the provided example of FIG. 2, at GUI screen 114a, a list of the first ten customers is requested to be displayed that shows ID, Name and City. Here the request 204a from GUI screen 114a is matched with an OData access pattern at 204b which will retrieve customer data from a particular database view at 204c.

For a selected customer in GUI screen 114a, detailed information about the selected customer. Here, request 206a indicates customer=2. An OData access pattern is matched to the request at 206b and at 206c, a web service is used to get details for customer=2.

At GUI screen 114b (e.g., where analytical data is displayed with a diagram), the user has selected to retrieved revenue data for customer=2 which generates an additional request to read revenue numbers for the selected customer=2. An OData request 208a is generated to retrieve revenue data for customer=2. An OData access pattern is matched to the request at 208b and an analytics view is used to retrieve and return revenue data for customer=2 at 208c.

At GUI screen 202 (e.g., where all SalesOrderItems behind the revenue numbers are listed), the end user wishes to obtain sales order data for customer=2. An OData request 210a is generated to retrieve sales order data for customer=2. An OData access pattern is matched to the request at 210b and some data source (e.g., 124d) is used to retrieve and return sales order data for customer=2 at 210c.

As can be seen, different requests for reading data are sent to the backend 212, following user interactions. The variety and complexity of requests can grow with the complexity of the model as well as with the number of screens used in the GUI 106. The service implementation has to select the most efficient data source to be used for each request to remain optimized. The idea is to compare each incoming request with a list of predefined patterns (e.g., OData access patterns 126). A table of (prioritized) rules (typically integrated into OData access patterns 126) defines one data source binding for each OData access pattern.

For the binding of data sources to OData requests a rule-based solution is applied. A rule consists of so-called OData Access Patterns (e.g., 128 and see FIG. 4) that are bound to a data source. OData Access Patterns 126 group multiple OData requests by generalizing parts of the request. OData Access patterns 126 can be very general (e.g., a pattern can cover all operations of an entity set (e.g., the model entities illustrated in FIG. 3). OData Access Patterns 126 can also be very specific (e.g., an OData access pattern 126 might just cover the read access of an entity set using a specific filter.

Referring now to FIG. 3, FIG. 3 represents an example data model 300 underlying the sample flow of FIG. 2 according to an implementation. Here the model includes model entities customers 302, revenue 304, sales orders 306, and items 308. These are the related model entities used in the example flow of FIG. 2. Note that while the example data model of FIG. 3 is simple, those of ordinary skill in the art will understand that data models can be of varying complexity. The example data model of FIG. 3 is provided as an example to enhance understanding of the described subject matter.

Figure 4A:
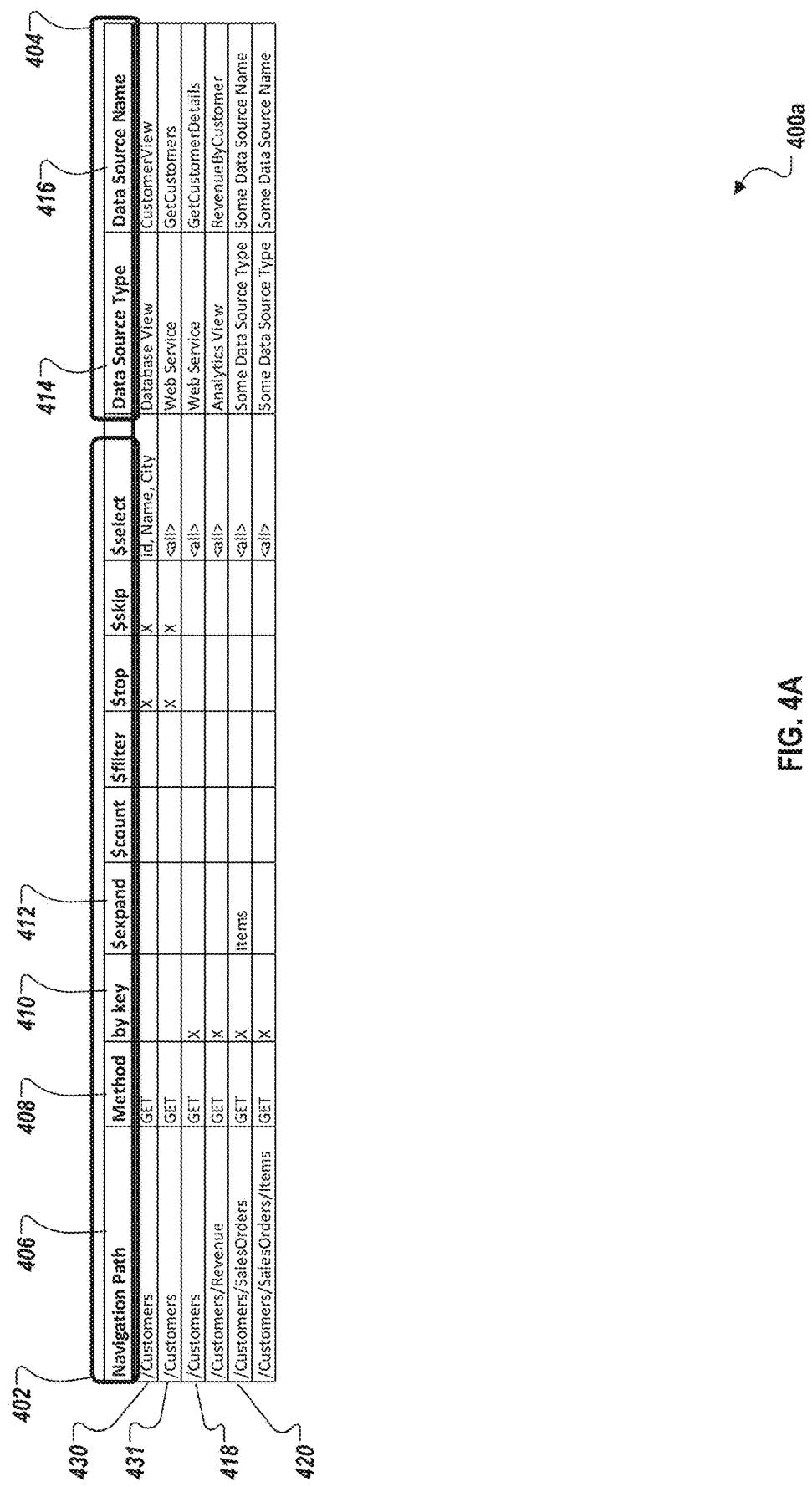
FIG. 4A is an example rule table used to select an optimal data source for an OData request according to an implementation.

FIG. 4A is an example rule table 400 used to select an optimal data source for an OData request according to an implementation. In typical implementations, a rule table 400 is logically one table. Technically it could be persisted or be setup a runtime startup in memory. In some implementations, it may be possible to split the rule table 400 into multiple linked tables. 402 represents elements of the rule table 400 that make up an OData access pattern and 404 represents elements of the rule table 400 that make up the corresponding data source. 402 and 404 together form a particular rule (e.g., 126 of FIG. 1).

The execution part of each rule 126 defines the data source to be used, optionally with predefined parameters. Depending on a target runtime and a data source, there may also be mappings to map the OData model and elements of the request to the data source. There can be many rules 126 for a service and each of its model entities, sorted by priority. The first matching rule 126 will typically be executed. In other words, if the first rule 126 has a matching OData access pattern 402, the corresponding data source 404 identified in the rule 126 will be used.

Typically, rule 126 consists of:
a navigation path 406 where model entities appear as segments,
a service operation/method 408 such as GET, QUERY, READ, CREATE, UPDATE, DELETE, etc.,
a by key parameter 410, and
a combination of OData specific parameters (e.g., $count, $select, $filter, etc.)—e.g., 412 in FIG. 4.

Note that there are there are two alternative ways to describe the possible operations:
CRUD Operations: CREATE, READ, UPDATE, DELETE and QUERY
HTTP verbs: GET, PUT, POST, DELETE Technically a READ operation corresponds to an HTTP GET request using an entity's key to read it, while a query can be an HTTP request using a $filter statement to select a set of entities. If using HTTP verbs, a specification is needed whether $filter and/or "by key" are supported. For example, rule 418 allows access to customer details using a GET operation and by providing a key value.

Moreover, if a request is made to GET customer details, rule 418 will be matched first and be used. For rule 418, the data store (DS) type is a web service and named "GetCustomerDetails." In another example, if a request is made to GET sales orders for customers, rule 420 will be matched first and be used. For rule 420, the DS type is some data source type (indicating some other type of data source than previously listed) and named "Some Data Source Name" (here indicating that the some data source type could be named anything). Note that, in some implementations, this example rule table describes the minimum data necessary for a rule table 400.

In other implementations, the set of columns could be extended to contain other fields, data, values, etc. In other implementations, a rule table might use a more technical view where HTTP verbs (e.g., GET, PUT, POST, etc.) are used in combination with real OData query options (e.g., $expand, $filter, etc.). Note that the granularity (i.e., the number of columns in the rule table) of the access patterns 126 depends on the capabilities and the programming model of a target runtime (e.g., the OData Runtime 122). There may be runtimes for which more columns will be needed.

FIGS. 4B and 4C are example alternative rule tables 400*b* and 400*c* used to select an optimal data source for an OData request according to an implementation. FIG. 4B represents the use of CRUD methods 432 (e.g., CREATE, READ, UPDATE, DELETE, QUERY) different from HTTP verbs used in FIG. 4A, because developers of business and other applications may be more familiar with them or be interfacing with applications designed to use CRUD methods. As previously mentioned, QUERY and READ operations functionality can be achieved by performing an HTTP GET request and using different query options in the URL (e.g., the $filter). FIG. 4C represents that different requests can be aimed at different scopes 434 in the data set. For example, in some cases, a requestor might wish to retrieve multiple entities (e.g., a collection), while in others a single entity (e.g., an entity), a single value of an entity (e.g., a value), or just a number of entities (e.g., a count) from a data set.

Figure 5:
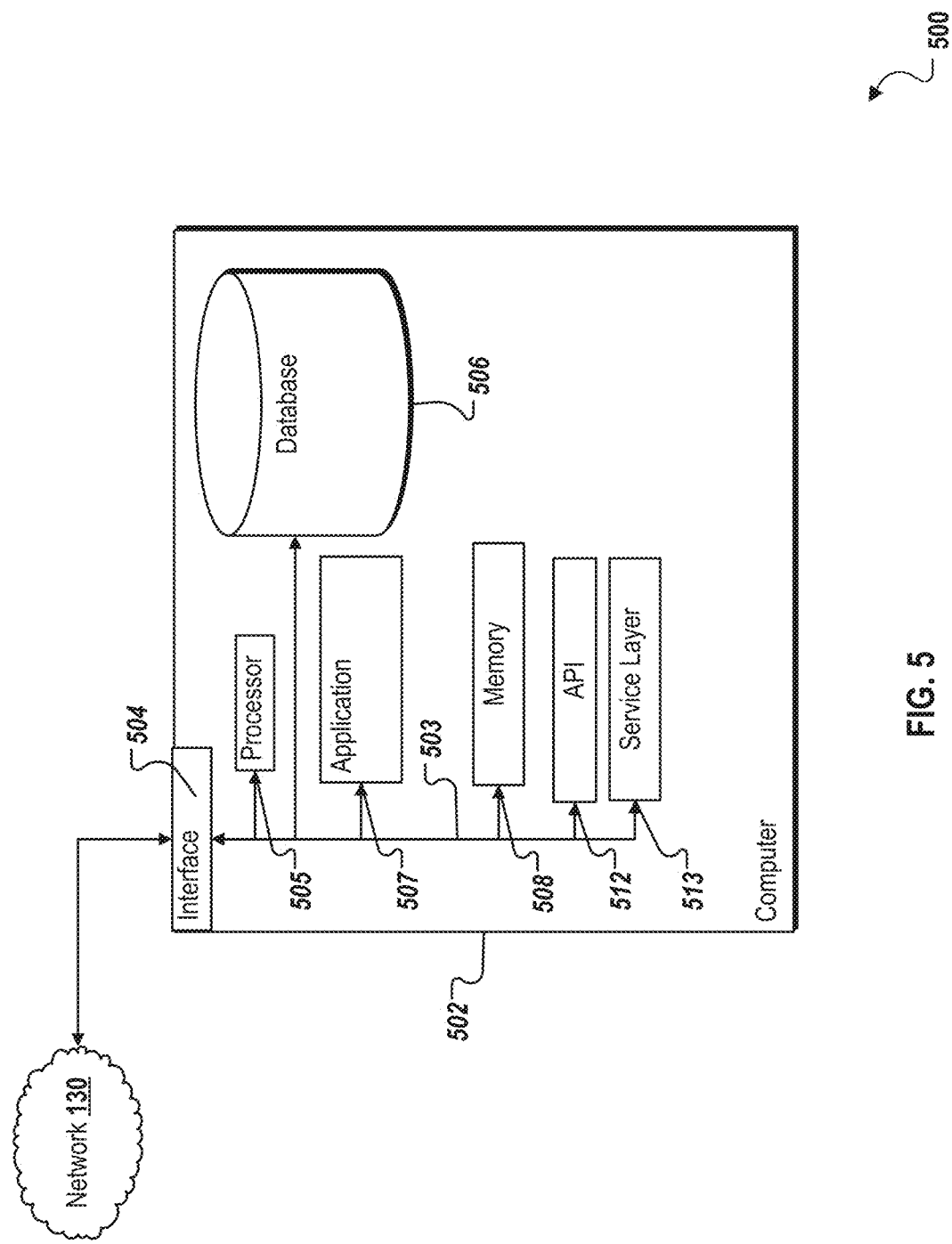
FIG. 5 is a block diagram of an exemplary computer used in the EDCS according to an implementation.

FIG. 5 is a block diagram 500 of an exemplary computer 502 used in the EDCS 100 according to an implementation. The illustrated computer 502 is intended to encompass any computing device such as a server, desktop computer, laptop/notebook computer, wireless data port, smart phone, personal data assistant (PDA), tablet computing device, one or more processors within these devices, or any other suitable processing device, including both physical and/or virtual instances of the computing device. Additionally, the computer 502 may comprise a computer that includes an input device, such as a keypad, keyboard, touch screen, or other device that can accept user information, and an output device that conveys information associated with the operation of the computer 502, including digital data, visual and/or audio information, or a GUI.

The computer 502 can process for/serve as a client (e.g., client 102 or one or more subcomponents), a server (e.g., server 120 or one or more subcomponents), and/or any other component of the EDCS 100 (whether or not illustrated). The illustrated computer 502 is communicably coupled with a network 130. In some implementations, one or more components of the computer 502 may be configured to operate within a cloud-computing-based environment.

At a high level, the computer 502 is an electronic computing device operable to receive, transmit, process, store, or manage data and information associated with the EDCS 100. According to some implementations, the computer 502 may also include or be communicably coupled with a cloud-computing server, application server, e-mail server, web server, caching server, streaming data server, business intelligence (BI) server, and/or other server.

The computer 502 can generate requests to transmit over network 130 (e.g., as a client 102) or receive requests over network 130 from a client application (e.g., user interface 106 and/or OData client 108) and responding to the received requests by processing the said requests in an appropriate software application, hardware, etc. In addition, requests may also be sent to the computer 502 from internal users (e.g., from a command console or by other appropriate access method), external or third-parties, other automated applications, as well as any other appropriate entities, individuals, systems, or computers.

Each of the components of the computer 502 can communicate using a system bus 503. In some implementations, any and/or all the components of the computer 502, both hardware and/or software, may interface with each other and/or the interface 504 over the system bus 503 using an API 512 and/or a service layer 513. The API 512 may include specifications for routines, data structures, and object classes. The API 512 may be either computer-language independent or dependent and refer to a complete interface, a single function, or even a set of APIs. The service layer 513 provides software services to the computer 502 and/or the EDCS 100. The functionality of the computer 502 may be accessible for all service consumers using this service layer. Software services, such as those provided by the service layer 513, provide reusable, defined business functionalities through a defined interface. For example, the interface may be software written in JAVA, C++, or other suitable language providing data in extensible markup language (XML) format or other suitable format. While illustrated as an integrated component of the computer 502, alternative implementations may illustrate the API 512 and/or the service layer 513 as stand-alone components in relation to other components of the computer 502 and/or EDCS 100. Moreover, any or all parts of the API 512 and/or the service layer 513 may be implemented as child or sub-modules of another software module, enterprise application, or hardware module without departing from the scope of this disclosure.

The computer 502 includes an interface 504. Although illustrated as a single interface 504 in FIG. 5, two or more interfaces 504 may be used according to particular needs, desires, or particular implementations of the computer 502 and/or EDCS 100. The interface 504 is used by the computer 502 for communicating with other systems in a distributed environment—including within the EDCS 100—connected to the network 130 (whether illustrated or not). Generally, the interface 504 comprises logic encoded in software and/or hardware in a suitable combination and operable to communicate with the network 150. More specifically, the interface 504 may comprise software supporting one or more communication protocols associated with communications such that the network 150 or interface's hardware is operable to communicate physical signals within and outside of the illustrated EDCS 100.

The computer 502 includes a processor 505. Although illustrated as a single processor 505 in FIG. 5, two or more processors may be used according to particular needs, desires, or particular implementations of the computer 502 and/or the EDCS 100. Generally, the processor 505 executes instructions and manipulates data to perform the operations of the computer 502. Specifically, the processor 505 executes the functionality required for providing pattern-based data source binding in OData services.

The computer 502 also includes a database 506 and memory 508 that hold data for the computer 502 and/or other components of the EDCS 100. Although illustrated as a single database 506 and memory 508 in FIG. 5, two or more databases 508 and memories 508 may be used according to particular needs, desires, or particular implementations of the computer 502 and/or the EDCS 100. While database 508 and memory 508 are illustrated as integral components of the computer 502, in alternative implementations, the database 506 and memory 508 can be external to the computer 502 and/or the EDCS 100. In some implementations, the database can be a conventional database or an in-memory database, or a mix of both. In some implementations, the database 506 and memory 508 can be combined into one component.

The application 507 is an algorithmic software engine providing functionality according to particular needs, desires, or particular implementations of the computer 502 and/or the EDCS 100, particularly with respect to functionalities required for providing pattern-based data source binding in OData services. For example, application 507 can serve as the user interface 106, OData client 108, mock data service 110, OData runtime 122, data source binding editor 134, and/or any other component of the EDCS 100 (whether or not illustrated). Further, although illustrated as a single application 507, the application 507 may be implemented as multiple applications 507 on the computer 502. In addition, although illustrated as integral to the computer 502, in alternative implementations, the application 507 can be external to the computer 502 and/or the EDCS 100.

There may be any number of computers 502 associated with, or external to, the EDCS 100 and communicating over network 130. Further, the term "client," "user," and other appropriate terminology may be used interchangeably as appropriate without departing from the scope of this disclosure. Moreover, this disclosure contemplates that many users may use one computer 502, or that one user may use multiple computers 502.

Figure 6:
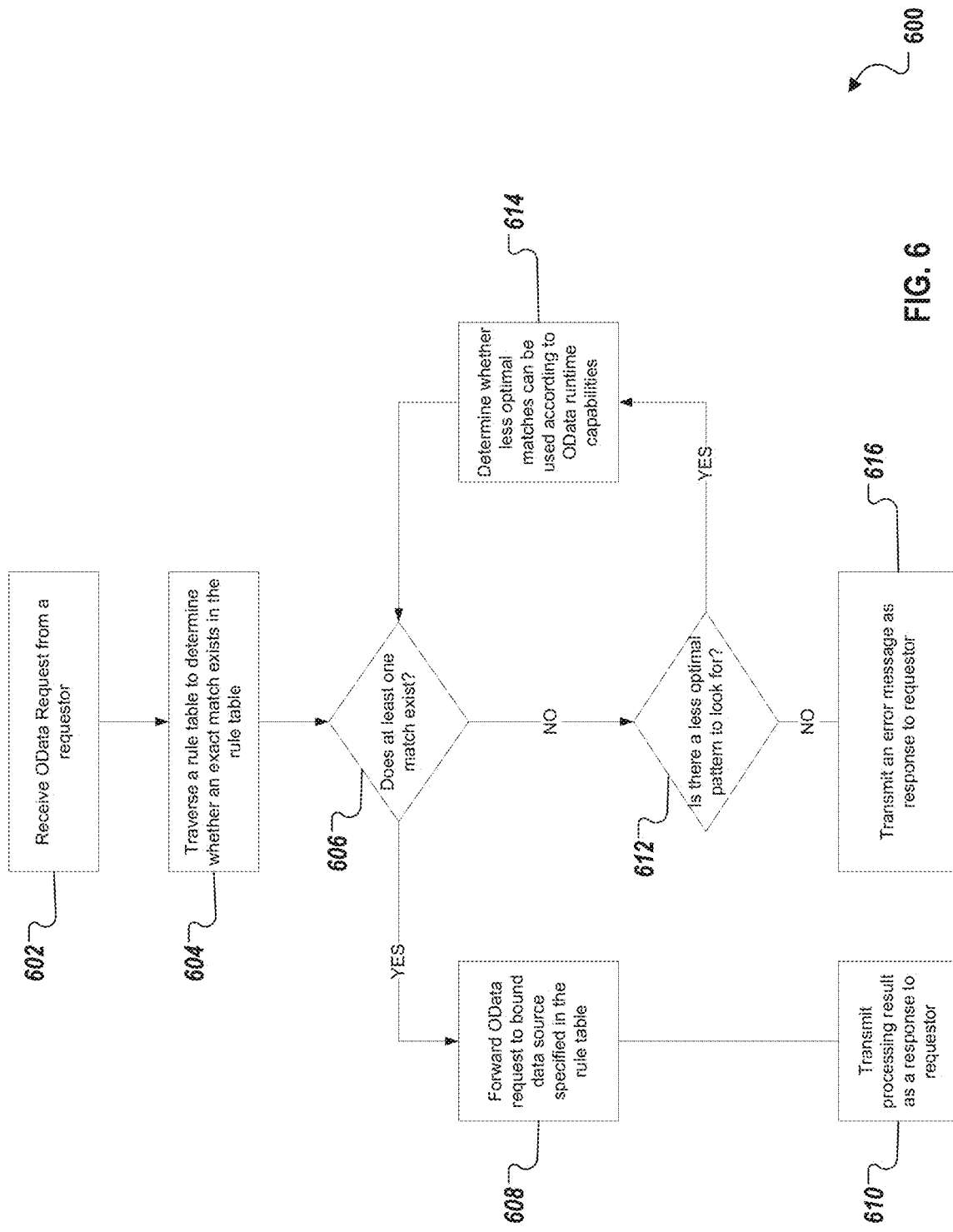
FIG. 6 is a flow chart of an example method for providing pattern-based data source binding in OData services according to an implementation.

FIG. 6 is a flow chart of an example method for providing pattern-based data source binding in OData services according to an implementation. For clarity of presentation, the description that follows generally describes method 600 in the context of FIGS. 1-5. However, it will be understood that method 600 may be performed, for example, by any other suitable system, environment, software, and hardware, or a combination of systems, environments, software, and hardware as appropriate. In some implementations, various steps of method 600 can be run in parallel, in combination, in loops, and/or in any order.

At 602, an OData request is received form a requestor. For example, in some implementations, the OData request could resemble the example URLs used as SELECT statements described above. In some implementations, the OData request can be parsed into its constituent parts for additional processing, conversion into other values and/or normalization, etc. From 602, method 600 proceeds to 604.

At 604, a rule table is traversed to determine whether an exact match exists in the rule table. For example for 210a of FIG. 2, the rule table 400a contains rule 420. Rule 420 will retrieve the SalesOrders for Customer(2) and return all the Items as part of the SalesOrders. From 604, method 600 proceeds to 606.

At 606, a determination is made whether an exact match exists between the received OData request and the rule table. Note that with respect to 604, rule 420 would be considered an exact match. If an exact match exists, method 600 proceeds to 608. If an exact match does not exist, method 600 proceeds to 612.

At 608, the request is forwarded to a bound data source specified in the rule table. For example, for rule 420, the request is forwarded to "Some Data Source Name." From 608, method 600 proceeds to 610.

At 610, the result of the OData request following processing by the bound data source is transmitted as a response to the requestor.

At 612, a determination is made whether a less optimal (e.g., more general) pattern exists in the rule table with which to attempt a match for the OData request. For example, assume that rule 430 is absent. In this case, there would not be an exact match for a request such as 204a. Also, a more general pattern would be to leave out the $select parameter. If a more general pattern exists, method 600 proceeds to 614. If a more general pattern does not exist, method 600 proceeds to 616 where an error message is transmitted to the requestor as a response. From 616, method 600 stops.

At 614, a determination is made whether any less optimal matches can be used according to the OData runtime capabilities. For example, still assuming rule 430 is absent, there is now a query for:

/Customers?$top=10 executed on the rule table. For this, the query in rule 431 would match. Compared to 430, this query is less efficient, as all fields (not just id, Name and City) are read. In this case, a tool can be used to point the service developer to potential optimizations. From 614, method 600 proceeds back to 606.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus," "computer," and/or "electronic computer device" (or equivalent as understood by one of ordinary skill in the art) refers to data processing hardware and encompasses all kinds of apparatus, devices, and machines for processing data, including by way of example, a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method for providing pattern-based data source binding in OData services, the method comprising:
   receiving an OData request over a computer network from an OData-based graphical user interface of a requesting computing device;
   accessing a design-time-defined rule table in a database, the design-time-defined rule table including a plurality of predefined, prioritized patterns and a plurality of computer data sources, wherein each particular pattern in the plurality of predefined, prioritized patterns defines a computer data source of the plurality of computer data sources for use in forwarding the received OData request to the computer data source;
   traversing, by a computer, the design-time-defined rule table in a prioritized order based on pattern priority and comparing the received OData request with patterns of the plurality of predefined, prioritized patterns in the design-time-defined rule table to determine if a pattern matches the received OData request;
   in response to determining that a match has occurred:
      forwarding the received OData request over the computer network to a computer data source defined by the determined pattern matching the received OData request;
      transmitting a result of the OData request to the requesting computing device over the computer network following processing of the OData request by the computer data source defined by the determined pattern matching the received OData request; and
      writing an entry into a Performance Trace;
   in response to determining that a match has not occurred:
      transmitting an error message as a response to the requesting computing device; and
   in response to an error:
      writing an entry to an error log.

2. The method of claim 1, comprising parsing the received OData request into constituent parts to enable the comparing.

3. The method of claim 1, comprising determining that the pattern matching the received OData request is not an exact match for the received OData request in the design-time-defined rule table.

4. The method of claim 3, comprising determining whether a more general pattern in the design-time-defined rule table will match the received OData request.

5. The method of claim 4, comprising, upon a determination that a less optimal pattern does not match the received OData request, transmitting an error message as a response to the requesting computing device.

6. The method of claim 4, comprising, upon a determination that a less optimal pattern matches the received OData request, determining whether a less optimal match between the received OData request and the design-time-defined rule table can be used based, at least in part, on runtime capabilities of an OData runtime.

7. The method of claim 1, wherein each particular pattern in the plurality of predefined, prioritized patterns defines an additional one or more computer data sources for use in forwarding the received OData request to the requesting computing device.

8. A non-transitory, computer-readable medium storing computer-readable instructions executable by a computer and configured to:
   receive an OData request over a computer network from an OData-based graphical user interface of a requesting computing device;
   access a design-time-defined rule table in a database, the design-time-defined rule table including a plurality of predefined, prioritized patterns and a plurality of computer data sources, wherein each particular pattern in the plurality of predefined, prioritized patterns defines a computer data source of the plurality of computer data sources for use in forwarding the received OData request to the computer data source;
   traverse the design-time-defined rule table in a prioritized order based on pattern priority and compare the received OData request with patterns of the plurality of predefined, prioritized patterns in the design-time-defined rule table to determine if a pattern matches the received OData request;

in response to a determination that a match has occurred:
forward the received OData request over the computer network to a computer data source defined by the determined pattern matching the received OData request;
transmit a result of the OData request to the requesting computing device over the computer network following processing of the OData request by the computer data source defined by the determined pattern matching the received OData request; and
write an entry into a Performance Trace;

in response to determining that a match has not occurred:
transmitting an error message as a response to the requesting computing device; and in response to an error:
writing an entry to an error log.

9. The medium of claim 8, configured to parse the received OData request into constituent parts to enable the comparing.

10. The medium of claim 8, configured to determine that the pattern matching the received OData request is not an exact match for the received OData request in the design-time-defined rule table.

11. The medium of claim 10, configured to determine whether a more general pattern in the design-time-defined rule table will match the received OData request.

12. The medium of claim 11, configure to transmit, upon a determination that a less optimal pattern does not match the received OData request, an error message as a response to the requesting computing device.

13. The medium of claim 11, configured to determine, upon a determination that a less optimal pattern matches the received OData request, whether a less optimal match between the received OData request and the design-time-defined rule table can be used based, at least in part, on runtime capabilities of an OData runtime.

14. The medium of claim 8, wherein each particular pattern in the plurality of predefined, prioritized patterns defines an additional one or more computer data sources for use in forwarding the received OData request to the requesting computing device.

15. A system, comprising:
a memory;
at least one hardware processor interoperably coupled with the memory and configured to:
receive an OData request over a computer network from an OData-based graphical user interface of a requesting computing device;
access a design-time-defined rule table in a database, the design-time-defined rule table including a plurality of predefined, prioritized patterns and a plurality of computer data sources, wherein each particular pattern in the plurality of predefined, prioritized patterns defines a computer data source of the plurality of computer data sources for use in forwarding the received OData request to the computer data source;
traverse the design-time-defined rule table in a prioritized order based on pattern priority and compare the received OData request with patterns of the plurality of predefined, prioritized patterns in the design-time-defined rule table to determine if a pattern matches the received OData request;
in response to a determination that a match has occurred:
forward the received OData request over the computer network to a computer data source defined by the determined pattern matching the received OData request;
transmit a result of the OData request to the requesting computing device over the computer network following processing of the OData request by the computer data source defined by the determined pattern matching the received OData request; and
write an entry into a Performance Trace;
in response to determining that a match has not occurred:
transmitting an error message as a response to the requesting computing device; and
in response to an error:
writing an entry to an error log.

16. The system of claim 15, configured to parse the received OData request into constituent parts to enable the comparing.

17. The system of claim 15, configured to determine that the pattern matching the received OData request is not an exact match for the received OData request in the design-time-defined rule table.

18. The system of claim 17, configured to determine whether a more general pattern in the design-time-defined rule table will match the received OData request.

19. The system of claim 18, configured to:
transmit, upon a determination that a less optimal pattern does not match the received OData request, an error message as a response to the requesting computing device; or
determine, upon a determination that a less optimal pattern matches the received OData request, whether a less optimal match between the received OData request and the design-time-defined rule table can be used based, at least in part, on runtime capabilities of an OData runtime.

20. The system of claim 15, wherein each particular pattern in the plurality of predefined, prioritized patterns defines an additional one or more computer data sources for use in forwarding the received OData request to the requesting computing device.

* * * * *